(12) United States Patent
Takezawa et al.

(10) Patent No.: US 7,140,733 B2
(45) Date of Patent: Nov. 28, 2006

(54) LIGHT SOURCE DEVICE AND PROJECTOR

(75) Inventors: Takeshi Takezawa, Matsumoto (JP);
Hiroyuki Meguro, Matsumoto (JP);
Toshiaki Hashizume, Okaya (JP);
Masakazu Kitamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 286 days.

(21) Appl. No.: 10/803,946

(22) Filed: Mar. 19, 2004

(65) Prior Publication Data

US 2004/0240207 A1    Dec. 2, 2004

(30) Foreign Application Priority Data

Mar. 28, 2003    (JP)    ............... 2003-092441

(51) Int. Cl.
*G03B 21/16* (2006.01)
*G03B 21/18* (2006.01)
*B60Q 3/04* (2006.01)
*F21V 15/00* (2006.01)

(52) U.S. Cl. .......................... 353/52; 362/362
(58) Field of Classification Search .............. 313/46, 313/113, 110, 114, 43, 44, 45; 353/52, 122, 353/119, 85; 362/43–45, 114
See application file for complete search history.

(56) References Cited

U.S. PATENT DOCUMENTS 6,784,601 B1 *    8/2004    Kai et al. .............. 313/46

2003/0025883 A1 *    2/2003    Yajima .............. 353/38

FOREIGN PATENT DOCUMENTS

| JP | U 63-70545 | 5/1988 |
| JP | A 05-325605 | 12/1993 |
| JP | A 06-289394 | 10/1994 |
| JP | 9-120067 A | 5/1997 |
| JP | A 2000-131763 | 5/2000 |
| JP | A 2001-67902 | 3/2001 |
| JP | A 2001-222976 | 8/2001 |
| JP | A 2002-75014 | 3/2002 |
| JP | A 2002-107823 | 4/2002 |
| JP | A 2002-151005 | 5/2002 |
| JP | A 2002-231184 | 8/2002 |
| JP | A 2002-373523 | 12/2002 |

\* cited by examiner

*Primary Examiner*—Christopher E Mahoney
*Assistant Examiner*—Andrew Kong
(74) *Attorney, Agent, or Firm*—Oliff & Berridge, PLC

(57) ABSTRACT

The light source device 10A has a light-emitting tube (11) (radial light source) and a reflector (12A). A cylindrical heat-conductive member (14A) is attached on an outer surface of a first sealing portion (114A) near a neck portion (121A) of a reflector (12A) in sealing portions (114) of the light-emitting tube (11). The heat-conductive member (14A) is attached along the outer surface of the first sealing portion (114A) with an end thereof being extended to a section near a light-emitting portion (113). A heat-radiation fin (15A) is attached on the other end of the heat-conductive member (14A).

5 Claims, 11 Drawing Sheets

LIGHT SOURCE DEVICE AND PROJECTOR

BACKGROUND OF THE INVENTION

1. Field of the Invention

The present invention relates to a light source device including a light-emitting portion that generates a light beam by an electric discharge between electrodes, and sealing portions provided on both sides of the light-emitting portion, and a projector.

2. Description of Related Art

Conventionally, a projector that forms an optical image by modulating a light beam irradiated by a light-emitting tube of a light source device in accordance with image information and projects the optical image in an enlarged manner has been used. In recent projectors, in order to clearly display the projected optical image, it is required to increase the illuminance of a light source lamp (light-emitting tube).

Since a great amount of heat is generated by the light-emitting portion of the light-emitting tube in accordance with the increase in the illuminance, cooling air is blown by a cooling fan etc. to control the temperature of the light-emitting tube (see Japanese Patent Laid-Open Publication No. 2002-107823(FIG. 1)).

However, since the temperature varies in accordance with the change in the flow rate and flow direction in the above arrangement where the light-emitting tube is cooled solely by the cooling air, it is difficult to control the temperature of the light-emitting tube at a predetermined temperature.

Further, in the Japanese Patent Laid-Open Publication No. 2002-107823, though the temperature of the light-emitting tube is controlled by cooling the light-emitting tube when the temperature of the light-emitting tube is high, the temperature is not controlled at a predetermined temperature by heating the light-emitting tube when the temperature of the light-emitting tube is low, e.g. immediately after a power switch is on.

SUMMARY OF THE INVENTION

An object of the present invention is to provide a light source device capable of controlling the light-emitting tube at a predetermined temperature and a projector having the light source device.

A light source device according to an aspect of the present invention has: a light-emitting tube including a light-emitting portion that generates a light beam by an electric discharge between electrodes; sealing portions provided on both sides of the light-emitting portion; and a heat-conductive member attached along the outer surface of at least one of the sealing portions, an end of the heat-conductive member being extended to a section near the light-emitting portion.

The heat-conductive member is made of a material having higher thermal conductivity than the thermal conductivity of the light-emitting tube, such as sapphire, quartz crystal, fluorite, alumina and aluminum nitride.

In the above aspect of the present invention, since the heat-conductive member is attached to the sealing portion of the light-emitting tube, a heat conduction is caused between the heat-conductive member and the sealing portion of the light-emitting tube. Since the temperature of the light-emitting tube is thus controlled by heat conduction, the temperature can be accurately adjusted as compared to an arrangement where the light-emitting tube is cooled by cooling air with the use of a cooling fan and the like.

For instance, when the temperature of the light-emitting tube is high, the heat of the light-emitting tube can be radiated through the heat-conductive member. On the other hand, when the temperature of the light-emitting tube is low, the heat can be transferred to the sealing portion and, in the end, the light-emitting portion through the heat-conductive member. For instance, by transferring the heat to the sealing portion and to the light-emitting portion through the heat-conductive member to warm the light-emitting tube when the light source lamp is powered on, the time required for irradiating steady-state light beam can be reduced. When the light-emitting tube is discharged at wattage lower than a standard wattage, electric discharge can be promoted between the pair of electrodes by transmitting the heat to the sealing portion and, in the end, the light-emitting portion of the light-emitting tube through the heat-conductive member.

Further, since the heat-conductive member extends toward a section near the light-emitting portion and the heat is transferred by heat conduction from the section near the light-emitting portion, the light-emitting tube can be efficiently cooled or heated.

In the above aspect of the present invention, the heat-conductive member may preferably be a cylindrical component.

By arranging the heat-conductive member in a cylindrical shape, when the heat-conductive member is attached to the sealing portion of the light-emitting tube, it is only necessary to insert the sealing portion of the light-emitting tube into the heat-conductive member, so that the heat-conductive member can be easily attached.

In the above aspect of the present invention, the light source device may preferably include a reflector that reflects the light beam irradiated by the light-emitting portion of the light-emitting tube, in which the first sealing portion of the light-emitting tube disposed on the side of the reflector may preferably be fixed to the reflector through the cylindrical heat-conductive member attached to the first sealing portion, and in which the first end of the heat-conductive member may preferably extend to the section near the light-emitting portion and a second end opposite to the first end may preferably extend to the outside of the reflector with a heat-radiation fin being attached to the second end.

Since the heat-radiation fin is attached to the second end of the heat-conductive member, the heat transferred to the heat-conductive member can be efficiently radiated from the heat-radiation fin.

Since the heat-radiation fin is attached to the second end of the heat-conductive member extending to the outside of the reflector, the heat of the heat-conductive member can be transferred to the outside of the reflector and the heat of the light-emitting tube does not stay on the reflector.

In the above aspect of the present invention, an optical system to be illuminated may preferably be disposed on a light-irradiation side of the light source device, the light source device may preferably have a reflector that reflects a light beam irradiated by the light-emitting portion of the light-emitting tube, in which the first sealing portion of the light-emitting tube disposed on the side of the reflector may preferably be fixed to the reflector through the cylindrical heat-conductive member attached to the first sealing portion, and in which a following formula is valid, where d1 denotes the diameter of the heat-conductive member attached to the first sealing portion, D1 denotes the diameter of the light-emitting portion of the light-emitting tube, T1 denotes the diameter of the first sealing portion, and θ1 denotes a minimum angle formed by the light beam irradiated by the light-emitting portion and reflected by the reflector to be used in the optical system and an extension line formed by extending the illumination optical axis of the optical system toward the light-emitting tube.

$$\sqrt{\left[\left(\frac{D1}{2}\right)^2 - \left(\frac{T1}{2}\right)^2\right]} \times 2 \times \tan\theta1 \leq d1 \leq 10 \times 2 \times \tan\theta1 \quad (1)$$

The formula (1) is derived as follows. When the distance from the center of the light-emitting portion to the end of the heat-conductive member on the side of the light-emitting portion is L1, the diameter d1 of the heat-conductive member is represented as follows.

$$d1 = 2 \times L1 \times \tan\theta1 \quad (2)$$

L1 is defined in the following range.

$$\sqrt{\left[\left(\frac{D1}{2}\right)^2 - \left(\frac{T1}{2}\right)^2\right]} \leq L1 \leq 10 \quad (3)$$

The formula (1) is derived based on the formulae (2) and (3).

The minimum angle $\theta1$ formed by the light beam reflected by the reflector to be used in the optical system and the extension line formed by extending the illumination optical axis of the optical system toward the light-emitting tube denotes the angle formed by a border light bordering the area where the light is naturally blocked on account of the presence of the first sealing portion on the side of the reflector and the extension line of the illumination optical axis.

According to the above arrangement, since the diameter of the heat-conductive member attached to the first sealing portion of the light-emitting tube is defined within the above range, the light beam irradiated from the light-emitting portion to the reflector is not blocked by the heat-conductive member. Accordingly, substantially the same amount of light can be secured as an arrangement where the heat-conductive member is not provided.

In the above aspect of the present invention, a heat-conductive sub-reflection mirror opposing to the reflector may preferably be attached to the second sealing portion of the light-emitting tube, and a heat-conductive transparent member may preferably be attached to the outer surface of the sub-reflection mirror.

The material of the heat-conductive transparent member is sapphire, for instance.

Since the heat-conductive sub-reflection mirror is attached to the second sealing portion and the heat-conductive transparent member is attached to the sub-reflection mirror, large heat-radiation area can be secured on the side of the second sealing portion, so that the heat from the light-emitting portion can be efficiently radiated when the temperature of the light-emitting tube is high, thus controlling the temperature of the light-emitting tube at a predetermined temperature. On the other hand, when the temperature of the light-emitting tube is low, the temperature of the light-emitting tube can be controlled at a predetermined temperature by heating the transparent member and transferring the heat to the second sealing portion through the sub-reflection mirror.

Since the sub-reflection mirror is attached to the second sealing portion, the light irradiated by the light-emitting tube to be a stray light can be reflected to the first reflector, thereby improving the light utilization rate.

In the light source device of the above aspect of the present invention, an optical system to be illuminated may preferably be disposed on a light-irradiation side of the light source device, the light source device may preferably have a reflector that reflects a light beam irradiated by the light-emitting portion of the light-emitting tube, and the first sealing portion of the light-emitting tube may preferably be fixed to the reflector and the cylindrical heat-conductive member is attached to the second sealing portion, in which a following formula is valid, where d2 denotes the diameter of the heat-conductive member attached to the second sealing portion, D1 denotes the diameter of the light-emitting portion of the light-emitting tube, T2 denotes the diameter of the second sealing portion, and $\theta2$ denotes a maximum angle formed by the light irradiated by the light-emitting portion to be used in the optical system and an extension line formed by extending the illumination optical axis of the optical system toward the light-emitting tube.

$$\sqrt{\left[\left(\frac{D1}{2}\right)^2 - \left(\frac{T2}{2}\right)^2\right]} \times 2 \times (-\tan\theta2) \leq d2 \leq 10 \times 2 \times (-\tan\theta2) \quad (4)$$

The formula (4) is derived as follows. When the distance from the center of the light-emitting portion to the end of the heat-conductive member on the side of the light-emitting portion is L2, the diameter d2 of the heat-conductive member is represented as follows.

$$d2 = 2 \times L2 \times (-\tan\theta2) \quad (5)$$

L2 is defined in the following range.

$$\sqrt{\left[\left(\frac{D1}{2}\right)^2 - \left(\frac{T2}{2}\right)^2\right]} \leq L2 \leq 10 \quad (6)$$

The formula (4) is derived based on the formulae (5) and (6).

The maximum angle $\theta2$ formed by the light beam irradiated by the light-emitting portion to be used by the optical system and the extension line formed by extending the illumination optical axis of the optical system toward the light-emitting tube denotes the angle formed by a border light bordering the area where the light beam irradiated by the light-emitting portion to the second sealing portion is naturally blocked by the second sealing portion and the extension line of the illumination optical axis.

According to the above arrangement, since the diameter of the heat-conductive member is arranged within the above range, the light beam irradiated by the light-emitting portion of the light-emitting tube is not blocked by the heat-conductive member attached to the second sealing portion of the light-emitting tube. Accordingly, substantially the same amount of light can be secured as an arrangement where the heat-conductive member is not provided.

In the above arrangement, a heat-conductive transparent member may preferably be attached to the outer surface of the cylindrical heat-conductive member attached to the second sealing portion of the light-emitting tube.

The material of the heat-conductive transparent member is sapphire, for instance.

In the above arrangement, since the heat-conductive transparent member is attached to the heat-conductive member attached to the second sealing portion, a large heat-radiation area can be secured, so that the heat-radiation efficiency can be improved and the temperature of the light-emitting tube can be set at a predetermined temperature. When the temperature of the light-emitting tube is low, the temperature of the light-emitting tube can be set at a predetermined temperature by heating the transparent member.

Further, since the transparent member is attached to the heat-conductive member, the light beam irradiated by the light-emitting portion of the light-emitting tube is not blocked.

A light source device according to another aspect of the present invention has: a light-emitting tube including a light-emitting portion that generates a light beam by an electric discharge between electrodes and a first and a second sealing portions provided on both sides of the light-emitting portion; and a first reflector that reflects the light beam irradiated by the light-emitting tube, in which the first sealing portion of the light-emitting tube is fixed to the first reflector and a heat-conductive sub-reflection mirror is attached to the second sealing portion, and a heat-conductive transparent member is attached to an outer surface of the sub-reflection mirror.

According to the above aspect of the present invention, since the heat-conductive sub-reflection mirror and the transparent member are attached to the second sealing portion, the heat can be transferred between the sub-reflection mirror and the transparent member, and the second sealing portion. When the light source device is cooled, the heat of the light-emitting tube can be radiated from the second sealing portion to the sub-reflection mirror and the transparent member. Since the transparent member is provided on the sub-reflection mirror, large heat-radiation area can be secured and the heat-radiation efficiency can be improved.

When the light source device is to be heated, the heat can be transferred to the light-emitting tube by applying a heat on the transparent member, so that the temperature of the light-emitting tube can be controlled. Since the temperature of the light-emitting tube is thus controlled by heat conduction, the temperature can be accurately adjusted as compared to an arrangement where the light-emitting tube is cooled by a cooling fan and the like.

A projector according to still another aspect of the present invention has: the above light source device; and an optical system disposed on a light-irradiation side of the light source device, the optical system including an optical modulator that modulates a light beam irradiated by the light source device in accordance with input image information to form an optical image, and a color-combining optical device that combines each color light from the optical modulator.

According to the above aspect of the present invention, since the light source device according to the above arrangement is provided, the temperature of the light-emitting tube can be controlled at a predetermined temperature.

In the above aspect of the present invention, the light source device may preferably have: a cooling device that cools the heat-conductive member or the transparent member; a heating device that heats the heat-conductive member or the transparent member; a temperature detector that detects the temperature of the light-emitting tube of the light source device; and a drive controller that drives the heating device when the temperature detected by the temperature detector is a first predetermined temperature or lower and drives the cooling device when the temperature detected by the temperature detector is a second predetermined temperature or higher.

The above cooling device may be a cooling fan for forcibly cooling the heat-conductive member and the transparent member, a thermoelectric conversion element and the like.

The heating device may be a heater including a heating wire and the like.

According to the above aspect of the present invention, since the drive controller that drives the heating device and the cooling device in accordance with the temperature of the light-emitting tube detected by the temperature detector is provided, the temperature of the light-emitting tube can be accurately controlled and the light-emitting tube can be driven within a most suitable temperature range.

DETAILED DESCRIPTION OF PREFERRED EMBODIMENT(S)

[First Embodiment]

A first embodiment of the present invention will be described below with reference to the attached drawings.

[Arrangement of Light Source Device]

Figure 1:
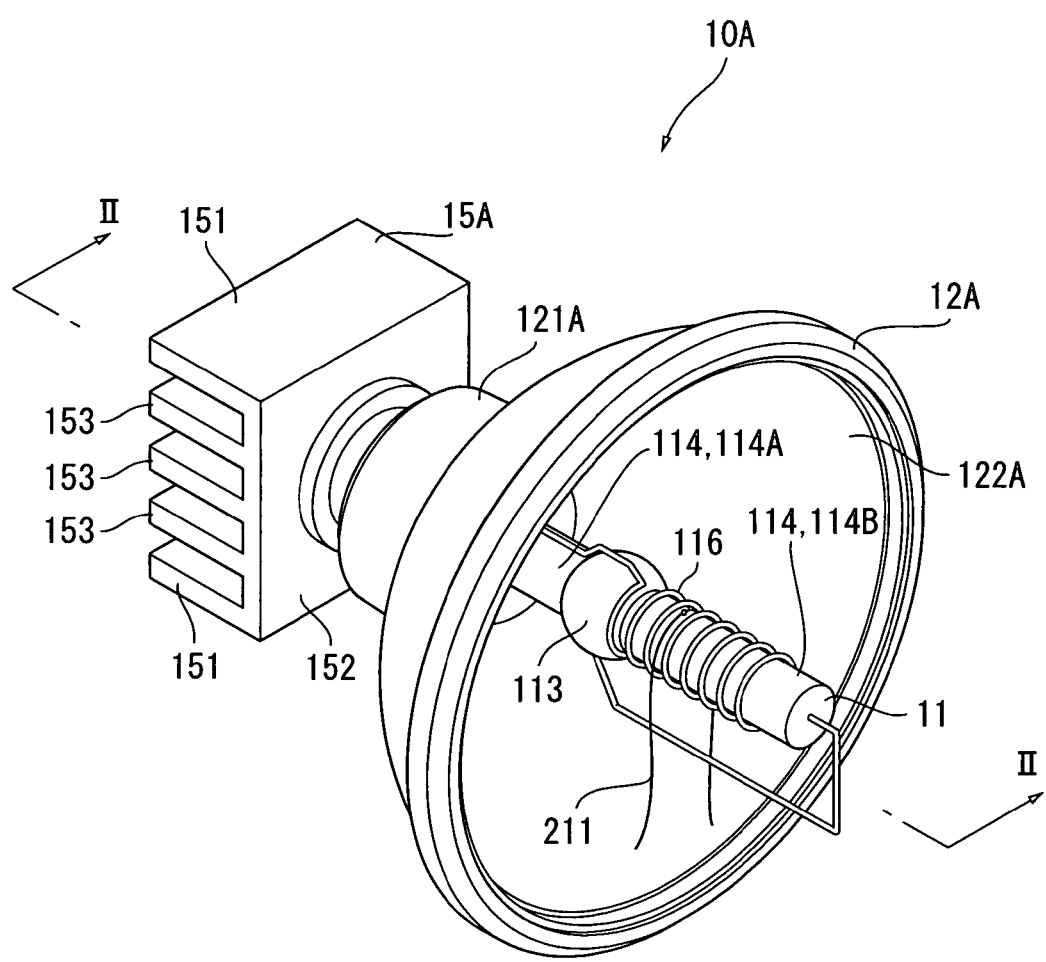
FIG. 1 is a perspective view showing a light source device according to a first embodiment of the present invention.
Figure 2:
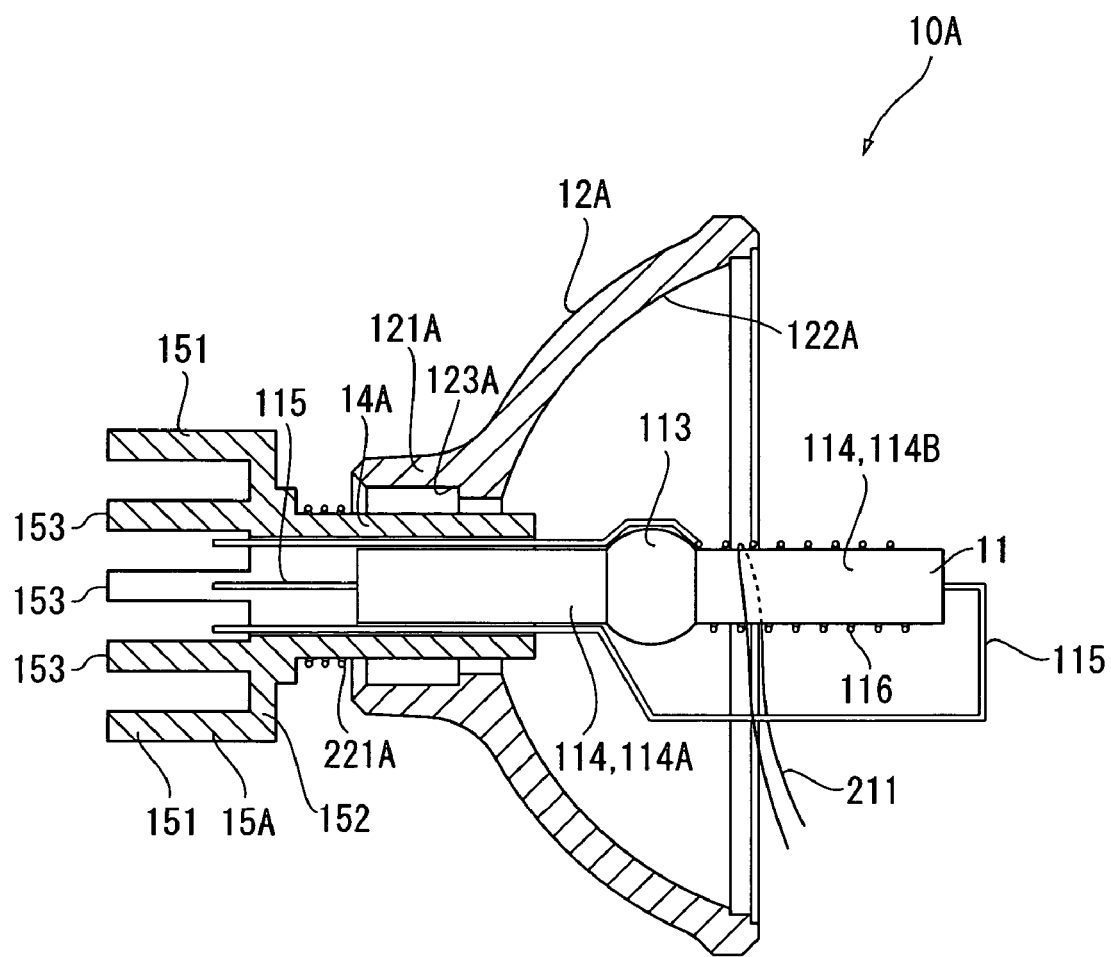
FIG. 2 is a cross section taken along II—II line in FIG. 1.

FIGS. 1 and 2 show a light source device 10A of the first embodiment.

The light source device 10A has a light-emitting tube 11 (radial light source) and a reflector 12A, where the light beam irradiated by the light-emitting tube 11 is reflected by the reflector 12A to be irradiated.

In the present embodiment, the reflector 12A is an ellipsoidal reflector, which is an integral glass molding including a neck portion 121A for the light-emitting tube 11 to be inserted and held and an ellipsoidal curved reflecting portion 122A that extends from the neck portion 121A.

A hole 123A is formed at the center of the neck portion 121A and the light-emitting tube 11 is inserted to the center of the hole 123A.

The light-emitting tube 11 is a super high-pressure mercury lamp having a silica glass tube with the central portion thereof being spherically bulged, the central portion being a light-emitting portion 113 and the portions extending on both sides of the light-emitting portion 113 being sealing portions 114.

The thermal conductivity of the silica glass tube of the light-emitting tube 11 is approximately 1 W/(m·k), in which the light-emitting portion 113 has a pair of electrodes (not shown) and mercury (light-emitting material), rare gas such as argon and xenon (lighting-on gas) and small amount of halogen are sealed in the light-emitting portion 113. When a predetermined voltage is applied on the pair of electrodes, an arc discharge is generated in the light-emitting portion 113 of the light-emitting tube 11 to excite evaporated mercury to generate light. Accordingly, the light-emitting tube 11 is lit.

The sealing portion 114 is a cylindrical component with metal foil such as molybdenum being sealed therein, thereby sealing the light-emitting portion 113. An end of the metal foil inside the sealing portion 114 is connected to the electrode and the other end is connected to a lead wire 115 extending from the sealing portion 114 to the outside.

A temperature detector 21 (see FIG. 7), which may be composed of thermocouples 211, is attached on the outer surface of the sealing portion 114.

A cylindrical heat-conductive member 14A is attached on the outer surface of a first sealing portion 114A (one of the sealing portions 114 of the light-emitting tube 11) on the side of the neck portion 121A of the reflector 12A, and the first sealing portion 114A is inserted into the hole 123A of the neck portion 121A of the reflector 12A to be fixed through the heat-conductive member 14A. Though not shown, a slit is cut along the longitudinal direction of the heat-conductive member 14A, the slit allowing thermal expansion of the first sealing portion 114A.

Incidentally, when the first sealing portion 114A of the light-emitting tube 11 is fixed on the reflector 12A, the light-emission center of the light-emitting portion 113 of the light-emitting tube 11 is substantially coincident with the first focus of the ellipsoidal curve of the reflecting portion 122A of the reflector 12A.

Any material may be used for the heat-conductive member 14A as long as the material has higher thermal conductivity than the thermal conductivity of the light-emitting tube 11, which may preferably be a material with thermal conductivity of 5 W/(m·K) or higher such as sapphire, quartz crystal, fluorite, alumina and aluminum nitride.

Incidentally, the lead wire 115 extending from the second sealing portion 114B to the outside is bent toward the first sealing portion 114A and is inserted into the hole 123A of the neck portion 121A of the reflector 12A together with the first sealing portion 114A.

The heat-conductive member 14A is attached along the outer surface of the first sealing portion 114A with an end thereof being stretched near the light-emitting portion 113. The heat-conductive member 14A and the first sealing portion 114A are adhered by an inorganic adhesive having high thermal conductivity (not shown) such as silica-alumina or aluminum nitride adhesive.

Figure 3:
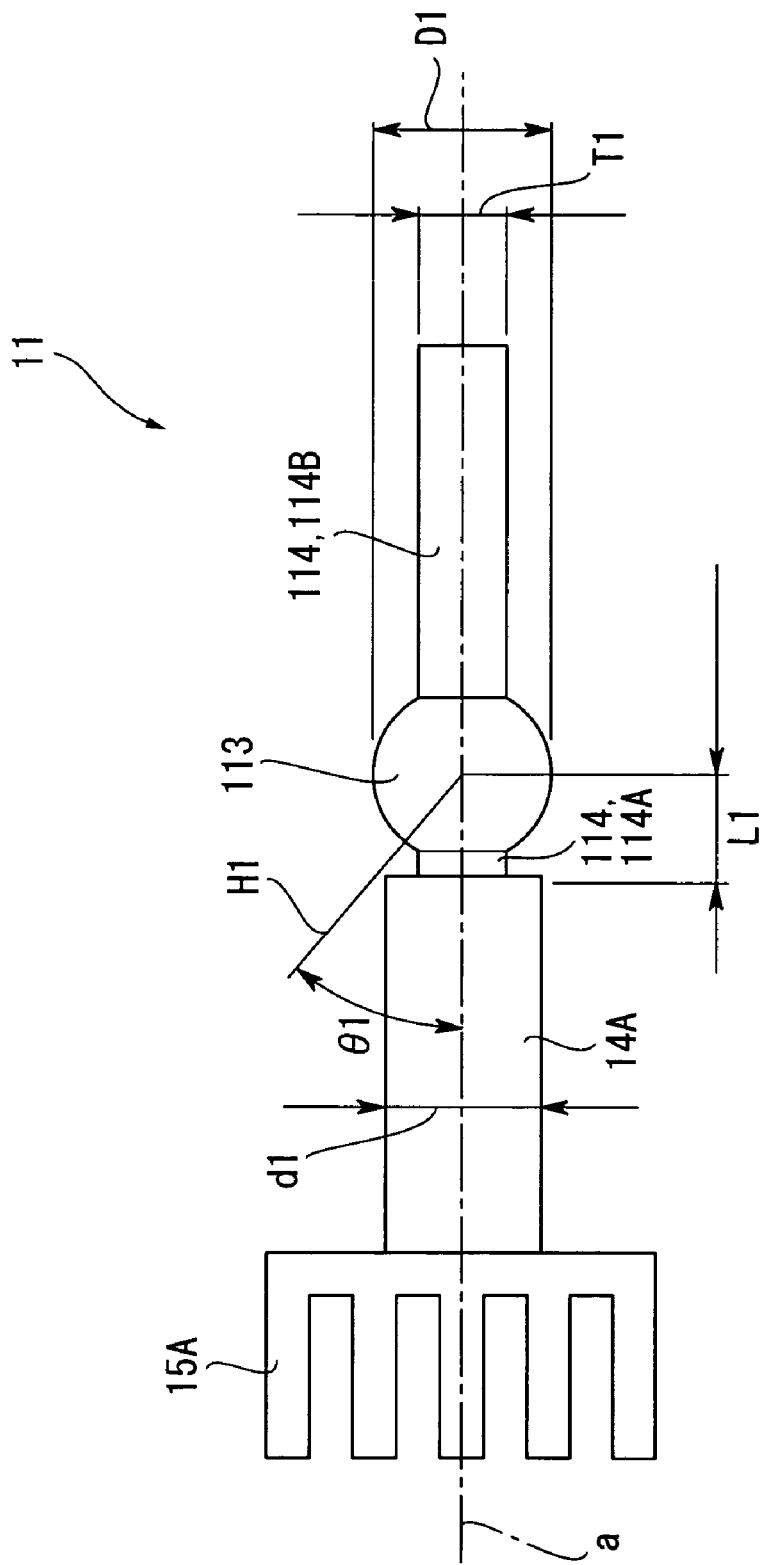
FIG. 3 is a schematic illustration showing a relationship between sizes of a light-emitting tube and a heat-conductive member of the light source device.

As shown in FIG. 3, when the diameter of the heat-conductive member 14A is d1, the diameter of the light-emitting portion 113 of the light-emitting tube 11 is D1, the diameter of the first sealing portion 114A is T1, the distance from the center of the light-emitting portion 113 to the end of the heat-conductive member 14A on the side of the light-emitting portion 113 is L1, and the minimum angle formed by the light beam irradiated by the light-emitting portion 113 and reflected by the reflector 12A to be used in an optical system (described below) disposed on the light-irradiation side of the light source device 10A and an extension line a formed by extending the illumination optical axis of the optical system toward the light-emitting tube 11 is θ1, L1 can be defined within the range of the following formula (7). Further, d1 can be represented by the formula (8).

$$\sqrt{\left[\left(\frac{D1}{2}\right)^2 - \left(\frac{T1}{2}\right)^2\right]} \leq L1 \leq 10 \tag{7}$$

$$d1 = 2 \times L1 \times \tan\theta1 \tag{8}$$

Accordingly, d1 can be defined within the range shown in formula (9).

$$\sqrt{\left[\left(\frac{D1}{2}\right)^2 - \left(\frac{T1}{2}\right)^2\right]} \times 2 \times \tan\theta1 \leq d1 \leq 10 \times 2 \times \tan\theta1 \tag{9}$$

Incidentally, the minimum angle θ1 formed by the light beam reflected by the reflector 12A to be used in an optical system and the extension line a formed by extending the illumination optical axis of the optical system is extended toward the light-emitting tube 11 denotes the angle formed by a border light H1 bordering the area where the light from the light-emitting portion 113 is naturally blocked on account of the presence of the first sealing portion 114A and the extension line a of the illumination optical axis.

As shown in FIG. 2, the other end of the heat-conductive member 14A is extended from the neck portion 121A of the reflector 12A to the outside of the reflector 12A to be exposed and a heating wire 221A such as nichrome (trademark) wire constituting the first heating device 22A (see FIG. 7) is wound around the outer surface of the other end.

A heat-radiation fin 15A is integrally formed on the other end.

As shown in FIGS. 1 and 2, the heat-radiation fin 15A has an approximately planarly-viewed C-shape having mutually opposing planarly-viewed rectangular side portions 151 and planarly-viewed rectangular bottom portion 152 that connects proximal ends of the side portions 151, which is disposed so that an opening formed on the side opposing to the bottom portion 152 faces the side opposite to the reflector 12A. Three pieces 153 extending from the bottom portion 152 toward the opening are disposed between the side portions 151 approximately in parallel to the side portions 151.

Figure 7:
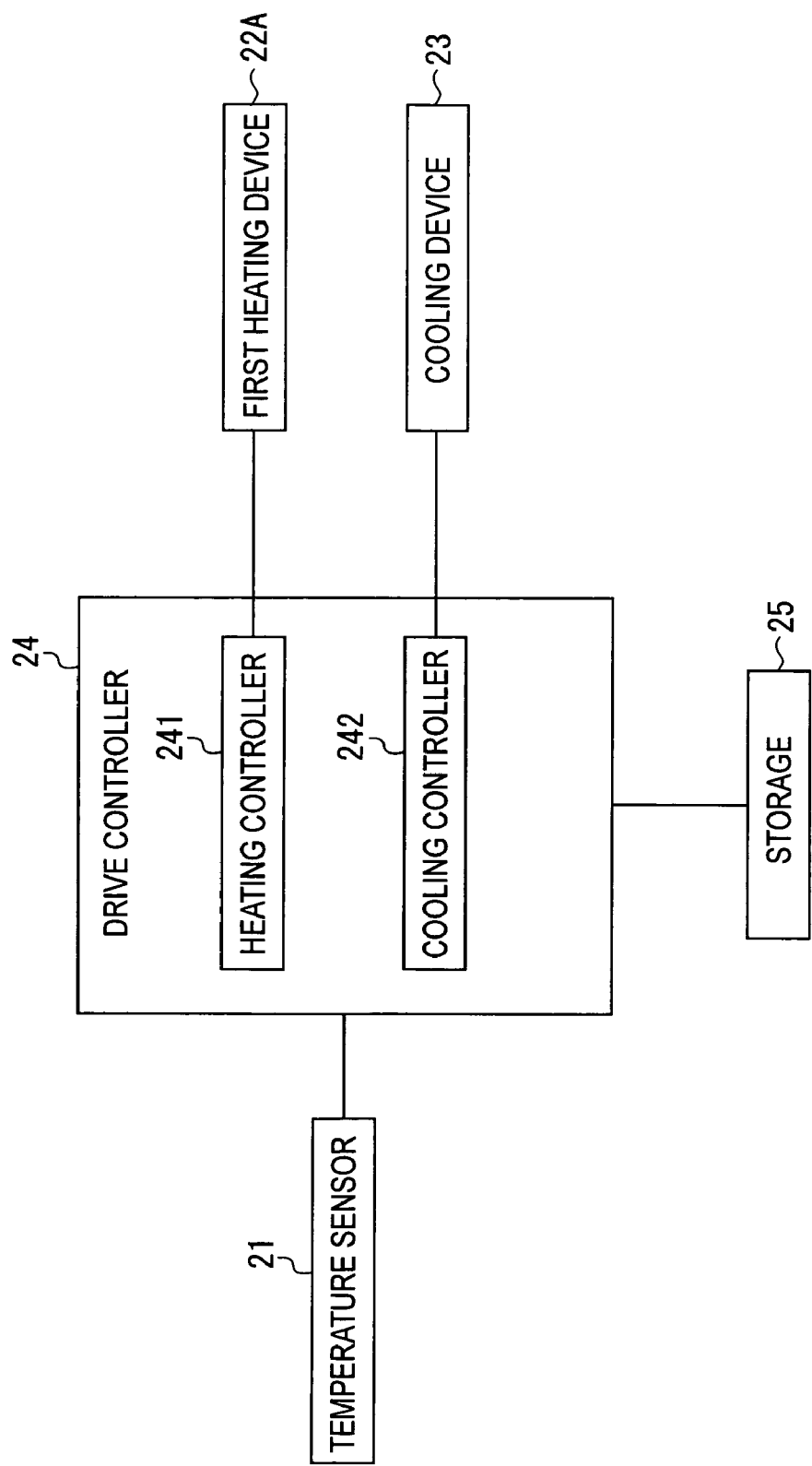
FIG. 7 is a block diagram showing the arrangement of the projector.

The heat-radiation fin 15A is cooled by a cooling fan (a cooling device 23: see FIG. 7). The cooling fan is disposed inside a projector 1 (described below), where the cooling air introduced to the inside of the projector 1 by the cooling fan cools the light source device 10A after cooling the other optical components such as an optical device 44 (described below).

Figure 4:
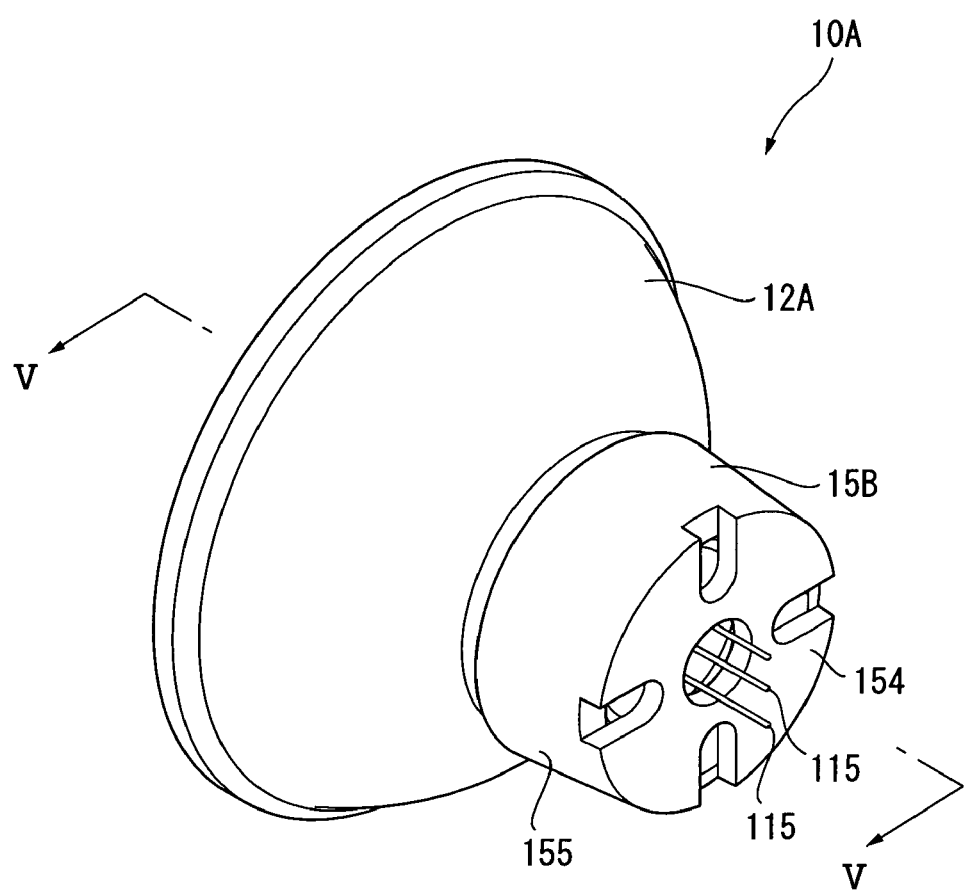
FIG. 4 is a perspective view showing a modification of a heat-radiation fin attached to the light-emitting tube of the light source device.
Figure 5:
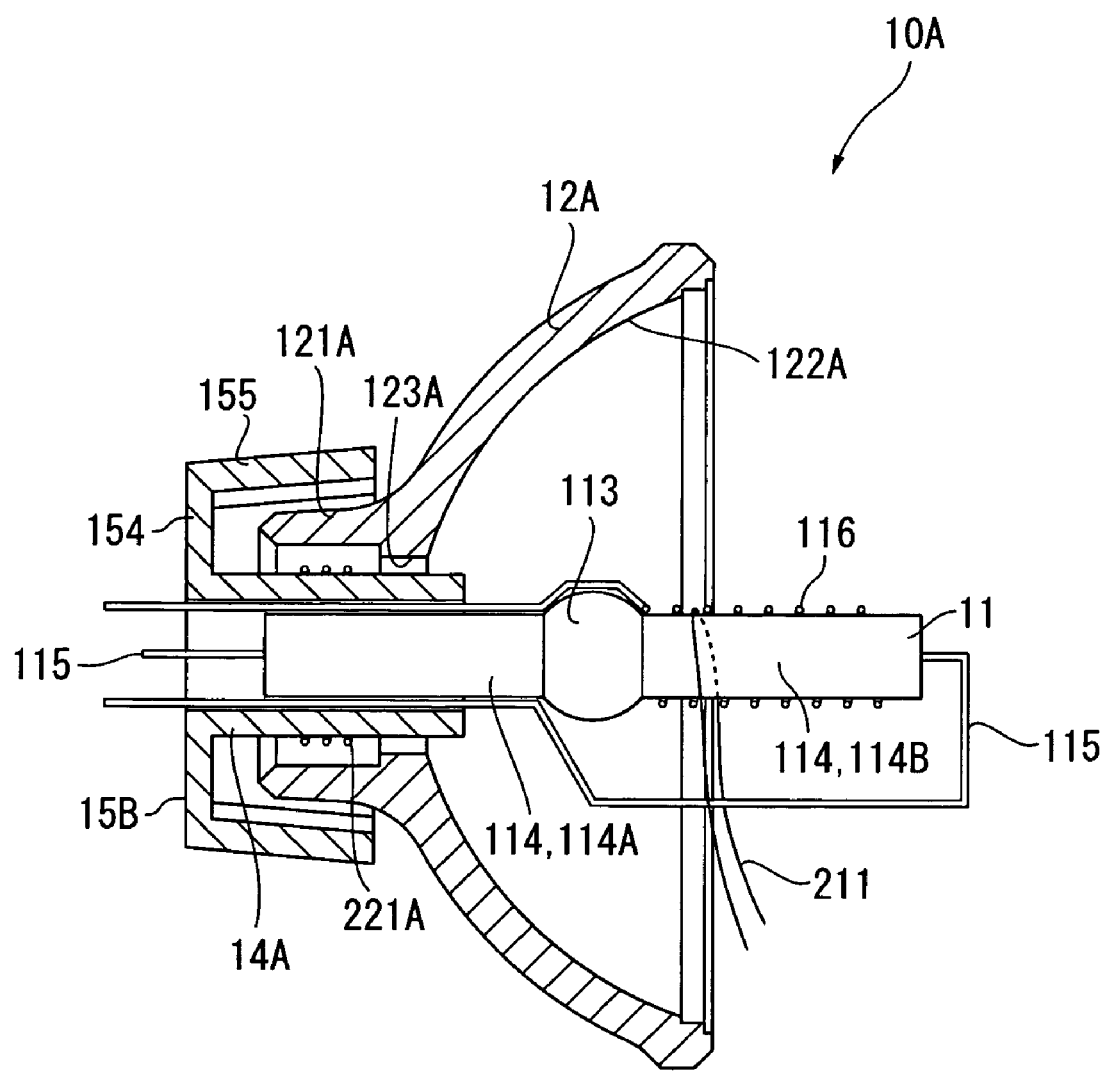
FIG. 5 is a cross section taken along V—V line in FIG. 4.

Incidentally, the shape of the heat-radiation fin is not restricted to the shape of the heat-radiation fin 15A. For instance, a heat-radiation fin 15B as shown in FIGS. 4 and 5 may be used.

The heat-radiation fin 15B has an approximately planarly-viewed circular bottom portion 154 and a cylindrical lateral side 155 perpendicularly extending from the edge of the bottom portion 154, of which opening opposing to the bottom portion 154 faces the reflector 12A.

On the other hand, a trigger wire 116 for initiating lighting is wound around a second sealing portion 114B of the light-emitting tube 11. The trigger wire 116 promotes the electric discharge between the pair of electrodes in initiating lighting.

Incidentally, though the super high-pressure mercury lamp is used for the light-emitting tube 11, a high-pressure mercury lamp, a metal halide lamp and a halogen lamp may alternatively be used.

[Arrangement of Optical System of Projector]

Figure 6:
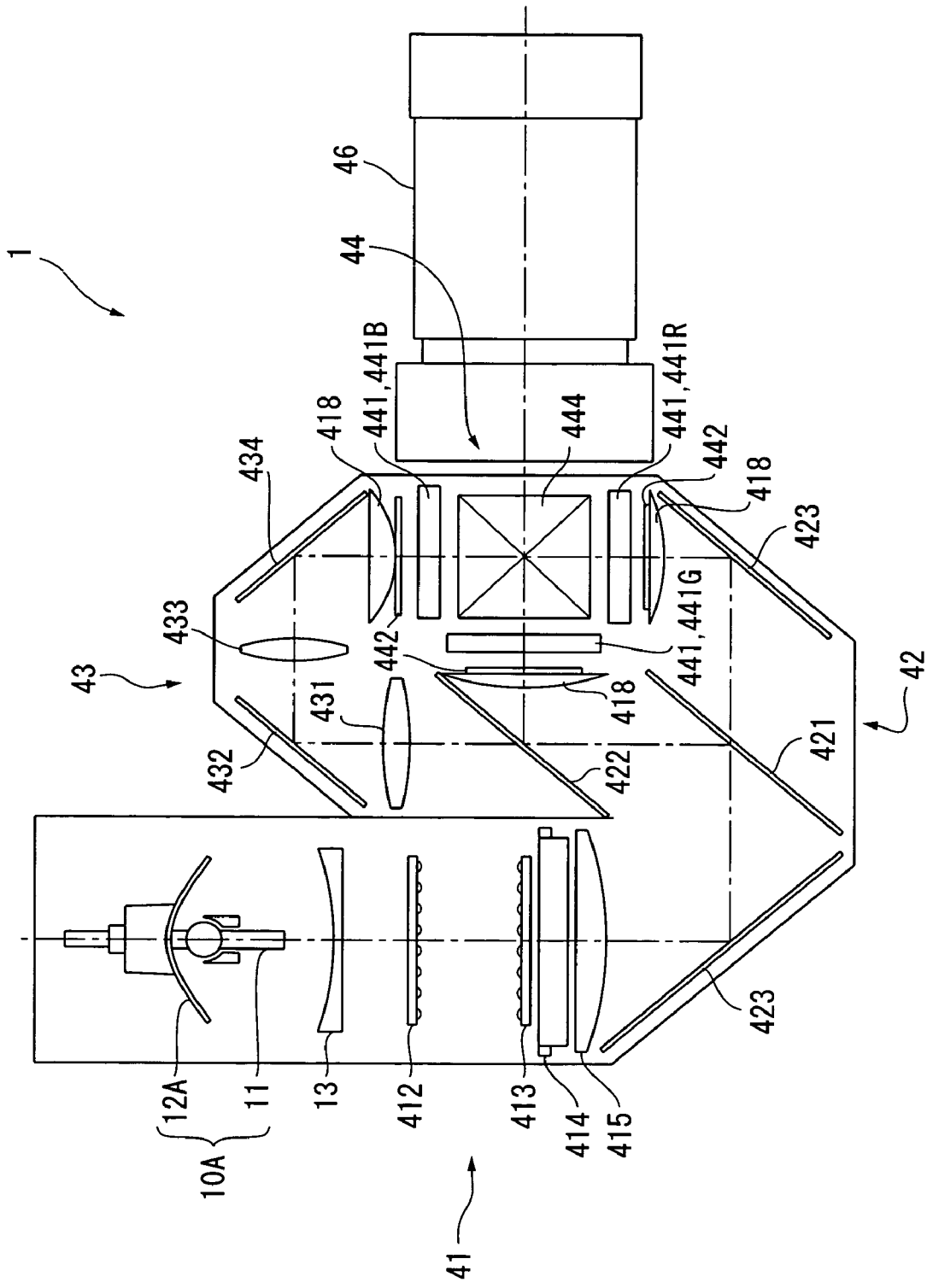
FIG. 6 is a schematic illustration showing an optical system of a projector.

The above light source device 10A is installed in a projector 1. FIG. 6 is a schematic illustration showing an optical system of the projector 1.

The projector 1 has an integrator illuminating optical system 41, a color-separating optical system 42, a relay optical system 43, an optical device 44 and a projection lens 46 (projection optical system).

The integrator illuminating optical system 41 is an optical system for substantially uniformly illuminating the image formation area of three liquid crystal panels 441 (referred to as liquid crystal panels 441R, 441G and 441B for each color of red, green and blue) of the optical device 44, which includes the light source device 10A, a parallelizing lens 13 disposed on the downstream of the light source device 10A, a first lens array 412, a second lens array 413, a polarization converter 414 and a superposing lens 415.

The parallelizing lens 13 parallelizes the light beam irradiated by the light source device 10A, which is a concave lens in the present embodiment.

The first lens array 412 has small lenses arranged in a matrix, the lenses having substantially rectangular profile viewed in the optical axis direction. The respective small lenses separate the light beam irradiated by the light-emitting tube 11 into a plurality of sub-beams. The profile of the respective small lenses is arranged to be approximately similar to the profile of the image formation area of the liquid crystal panels 441.

The second lens array 413 is arranged approximately in the same manner as the first lens array 412, which includes small lenses arranged in a matrix. The second lens array 413 focuses the image of the small lenses of the first lens array 412 onto the liquid crystal panels 441 together with the superposing lens 415.

The polarization converter 414 is disposed between the second lens array 413 and the superposing lens 415. The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 is substantially superposed on the liquid crystal panels 441 of the optical device 44 by the superposing lens 415. Since only one-type of polarized light can be used in a projector 1 using the liquid crystal panels 441 that modulate polarized light, approximately half of the light beam from the light-emitting tube 11 emitting random polarized light cannot be used. Accordingly, with the use of the polarization converter 414, all of the light beam irradiated by the light-emitting tube 11 is converted into substantially uniform polarized light to enhance the light utilization efficiency of the optical device 44. Incidentally, such polarization converter 414 is disclosed in, for instance, Japanese Patent Laid-Open Publication No. H08-304739.

The color-separating optical system 42 has two dichroic mirrors 421 and 422, and a reflection mirror 423, which separates the plurality of sub-beams irradiated from the integrator illuminating optical system 41 by the dichroic mirrors 421 and 422 into three color lights of red (R), green (G) and blue (B).

The dichroic mirrors 421 and 422 are optical elements having a base on which a wavelength-selection film that reflects a light beam of a predetermined wavelength and transmits a light beam of the other wavelength is formed, in which the dichroic mirror 421 disposed on the upstream of the optical path is a mirror that transmits the red light and reflects the other color lights. The dichroic mirror 422 disposed on the downstream of the optical path is a mirror that reflects the green light and transmits the blue light.

The relay optical system 43 has an incident-side lens 431, a relay lens 433, and reflection mirrors 432 and 434, which guides the blue light transmitted through the dichroic mirror 422 of the color-separating optical system 42 to the optical device 44. Incidentally, the relay optical system 43 is used for the optical path of the blue light in order to avoid deterioration in the light utilization efficiency on account of light dispersion and the like caused by the longer length of the optical path of the blue light than the optical path of the other color light. Though such arrangement is used in the present embodiment because of the longer optical path of the blue light, the optical path of the red light may alternatively be lengthened.

The red light separated by the above-described dichroic mirror 421 is bent by the reflection mirror 423 and, subsequently, fed to the optical device 44 through a field lens 418. The green light separated by the dichroic mirror 422 is directly fed to the optical device 44 through the field lens 418. The blue light is condensed and bent by the lenses 431, 433 and the reflection mirrors 432 and 434 of the relay optical system 43 to be fed to the optical device 44 through the field lens 418. Incidentally, the field lenses 418 provided on the upstream of the optical path of the respective color lights of the optical device 44 are provided for converting the respective sub-beams irradiated by the second lens array 413 into light beams parallel to the illumination optical axis.

The optical device 44 modulates the light beam incident thereon in accordance with image information to form a color image, which includes three incident-side polarization plates 442 on which the respective color lights separated by the color-separating optical system 42 are incident, the liquid crystal panels 441 (441R, 441G and 441B: optical modulator) disposed on the downstream of the respective incident-side polarization plates 442, irradiation-side polarization plates (not shown) disposed on the downstream of the respective liquid crystal panels 441R, 441G and 441B, and a cross dichroic prism 444 (color-combining optical system).

The liquid crystal panels 441R, 441G and 441B use, for instance, polycrystalline silicon TFT as a switching element.

In the optical device 44, the respective color lights separated by the color-separating optical system 42 are modulated by the three liquid crystal panels 441R, 441G and 441B, the incident-side polarization plates 442 and the irradiation-side polarization plates in accordance with image information to form an optical image.

The incident-side polarization plates 442 transmits a polarized light in a predetermined direction out of the respective color lights separated by the color-separating optical system 42 and absorbs the other light beam, which have a substrate made of sapphire glass and the like with a polarization film attached thereon. Alternatively, a polarization film may be attached on the field lens 418 without using a substrate.

The irradiation-side polarization plates are arranged approximately in the same manner as the incident-side polarization plates 442, which transmit the polarized light in a predetermined direction out of the light beam irradiated by the liquid crystal panels 441 and absorb the other light beams. Alternatively, a polarization film may be attached on the cross dichroic prism 444 without using a substrate.

The incident-side polarization plates 442 and the irradiation-side polarization plates are arranged so that the directions of the polarization axes thereof are orthogonal with each other.

The cross dichroic prism 444 combines the optical image irradiated by the irradiation-side polarization plate and modulated for each color light to form a color image.

In the cross dichroic prism 444, a dielectric multi-layer film for reflecting the red light and a dielectric multi-layer film for reflecting the blue light are formed along the boundaries of four right-angle prisms approximately in X-shape, the dielectric multi-layer films combining the three color lights.

The color image irradiated by the cross dichroic prism 444 is projected by the projection optical system 46 in an enlarged manner to form a large-size image on a screen (not shown).

[Detailed Arrangement of Projector 1]

As shown in FIG. 7, the projector 1 having the above optical system has a temperature detector 21 attached to the sealing portion 114 of the light-emitting tube 11, and a drive controller 24 for controllably driving the heating device 22A and the cooling device 23 based on the temperature detected by the temperature detector 21.

The temperature detector 21 is a temperature sensor including the thermocouple 211 (see FIG. 2) and the like.

The first heating device 22A has a heating wire 221A wound around the heat-conductive member 14A, and a voltage-applying device (not shown) for applying voltage on the heating wire 221A.

The drive controller 24 is formed on a main board for controllably driving the entire projector 1, which includes a heating controller 241 for controllably driving the first heating device 22A, and a cooling controller 242 for controllably driving the cooling device 23.

The projector 1 also has a storage 25 such as a ROM that stores a temperature range necessary for driving the light-emitting tube 11 (t1 to t2; e.g. t1=600° C. and t2=700° C.) and a limit temperature t3 (e.g. 950° C.) of the light-emitting tube 11.

Figure 8:
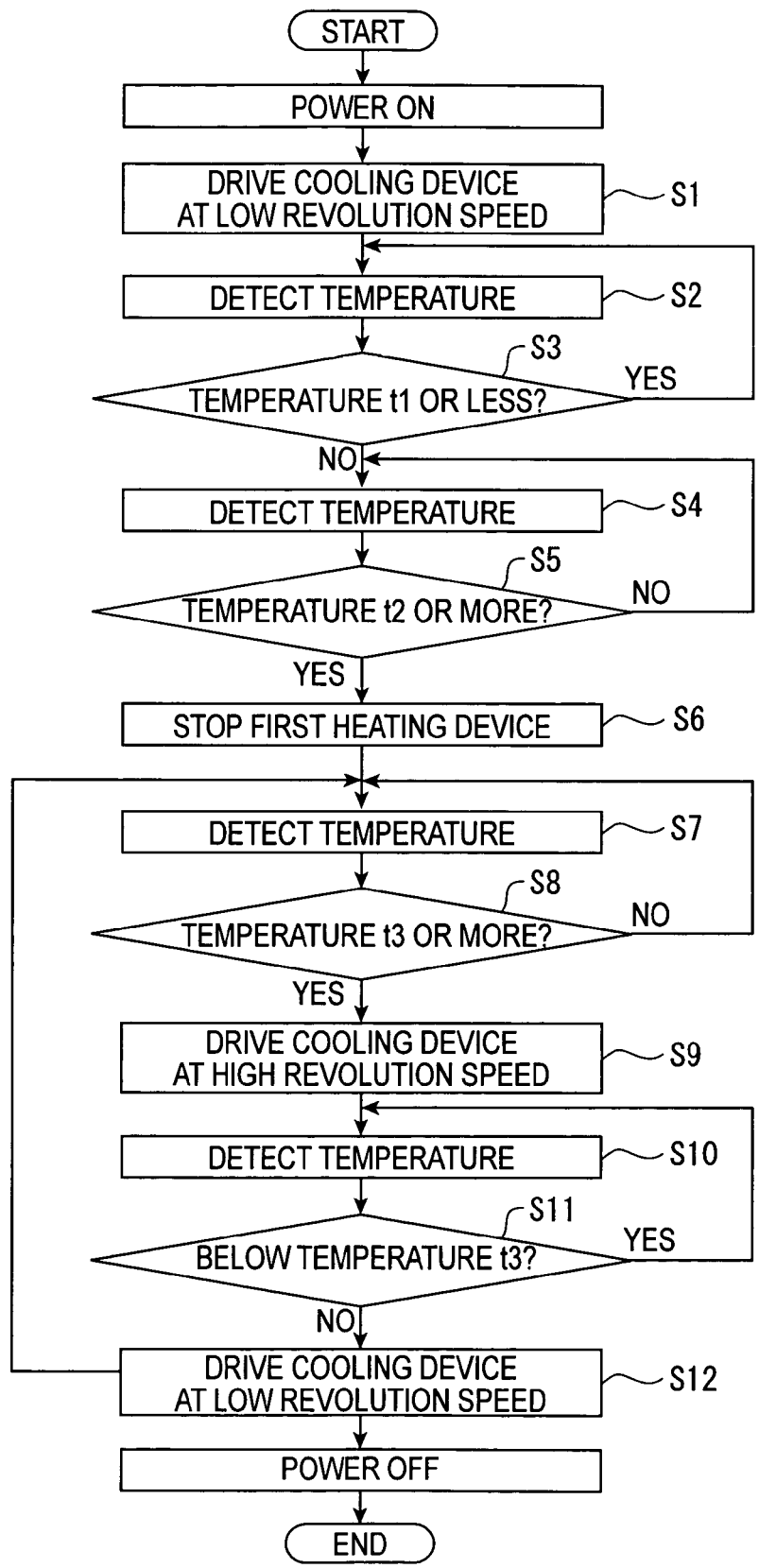
FIG. 8 is a flow chart showing how the temperature of the light-emitting tube is adjusted.

Such projector 1 is driven as shown in the flowchart of FIG. 8.

(1) When the power switch of the projector 1 is pushed and the power is on, the cooling fan (the cooling device 23) is rotated at a low revolution number. Further, the first heating device 22A is driven (S1).

At this time, when voltage is applied on the heating wire 221A by the voltage-applying device of the first heating device 22A, heat is generated from the heating wire 221A, which is transmitted to the heat-conductive member 14A. Further, the heat transmitted to the heat-conductive member 14A is transmitted to the sealing portion 114A.

Then, the heat is transmitted from the sealing portion 114A to the light-emitting portion 113 to evaporate the mercury inside the light-emitting portion 113.

(2) Next, the temperature of the light-emitting tube 11 is detected by the temperature detector 21 (S2), and whether the detected temperature of the light-emitting tube 11 is t1 or lower or not is determined (S3). When the temperature of the light-emitting tube 11 is t1 or lower, the first heating device 22A is continuously driven.

(3) When the temperature of the light-emitting tube 11 exceeds t1, the temperature of the light-emitting tube 11 is detected again by the temperature detector 21 (S4) to determine whether the temperature is t2 or higher or not (S5). When the temperature of the light-emitting tube 11 is determined to be t2 or higher, the drive of the first heating device 22A is stopped (S6).

Incidentally, when the temperature of the light-emitting tube 11 is lower than t2, the heating process is continued by the first heating device 22A.

(4) After stopping the drive of the first heating device 22A, the temperature of the light-emitting tube 11 is detected by the temperature detector 21 (S7) and whether the temperature of the light-emitting tube 11 is t3 or higher or not is determined (S8). When the temperature is determined to be t3 or higher, the revolution number of the cooling fan (cooling device 23) is raised (S9).

Incidentally, when the temperature is determined to be lower than t3, the temperature is continuously detected by the temperature detector 21.

(5) After raising the revolution number of the cooling fan (cooling device 23), the temperature of the light-emitting tube 11 is detected by the temperature detector 21 (S10) and whether the temperature of the light-emitting tube 11 is t3 or lower or not is determined (S11). When the temperature is determined to be lower than t3, the revolution number of the cooling fan (cooling device 23) is lowered (S12).

Incidentally, when the temperature of the light-emitting tube 11 is t3 or higher, the cooling device 23 is continuously driven at a high revolution number.

(6) After lowering the revolution number of the cooling fan, the temperature of the light-emitting tube 11 is detected by the temperature detector 21 (S7) and whether the temperature of the light-emitting tube 11 is t3 or higher or not is determined (S8). When the temperature is t3 or higher, the revolution number of the cooling fan (cooling device 23) is raised (S9) and the processes of S10 to S12 are further conducted.

(7) Lastly, the process is terminated when a user turns off the power.

According to the present embodiment, following advantages can be obtained.

(1-1) Since the heat-conductive member 14A is attached on the first sealing portion 114A of the light-emitting tube 11, heat conduction occurs between the heat-conductive member 14A and the first sealing portion 114A of the light-emitting tube 11. Since the temperature of the light-emitting tube 11 is controlled by heat conduction, the temperature can be accurately adjusted as compared to an arrangement where the light-emitting tube 11 is forcibly cooled only by a cooling fan and the like.

For instance, when the temperature of the light-emitting tube 11 is high, the heat of the light-emitting tube 11 can be radiated through the heat-conductive member 14A. Further, when the temperature of the light-emitting tube 11 is low, the heat of the heating wire 221A can be transmitted to the light-emitting tube 11 through the heat-conductive member 14A. For instance, by warming the light-emitting tube 11 in lighting as in the present embodiment, the time required for irradiating steady-state light beam can be reduced. When the light-emitting tube 11 is to be discharged at a wattage lower than a standard wattage, electric discharge can be generated between the pair of electrodes by transmitting the heat to the first sealing portion 114 and, in the end, the light-emitting portion 113 of the light-emitting tube 11 through the heat-conductive member 14A in lighting the light emitting tube 11.

Further, since the heat-conductive member 14A extends toward a section near the light-emitting tube 113 and the heat is transferred by heat conduction from the section near the light-emitting portion 113, the light-emitting tube 11 can be efficiently cooled or heated.

(1-2) Since the heat-conductive member 14A has a cylindrical shape, it is only required to insert the sealing portion 114A into the heat-conductive member 14A for attaching the heat-conductive member 14A to the sealing portion 114A of the light-emitting tube 11, so that the heat-conductive member 14A can be easily attached.

(1-3) Since the diameter d1 of the heat-conductive member 14A is defined within a range shown in the formula (9), the light beam irradiated by the light-emitting portion 113 toward the reflector 12A is not blocked by the heat-conductive member 14A. Accordingly, approximately the same amount of light can be secured as an arrangement where the heat-conductive member 14A is not provided.

(1-4) Since the heat-radiation fin 15A is provided on an end of the heat-conductive member 14A attached to the light-emitting tube 11, wide heat-radiation area can be secured, thereby enhancing the heat-radiation efficiency. In addition, since the projector 1 has the cooling fan (cooling device 23), the cooling process can be conducted in a further efficient manner, thereby setting the temperature of the light-emitting tube 11 at a predetermined temperature.

Further, since the heat-radiation fin 15A is attached to an end of the heat-conductive member 14A exposed to the outside of the reflector 12A, the heat does not stay on the side of the reflector 12A.

(1-5) Since the first sealing portion 114A of the light-emitting tube 11 and the heat-conductive member 14A are adhered through a heat-conductive adhesive in the present embodiment, the heat conduction between the first sealing portion 114A and the heat-conductive member 14A is not blocked by the adhesive.

(1-6) Since the cooling device 23 and the first heating device 22A are controlled by the drive controller 24, the temperature of the light-emitting tube 11 can be further accurately set. Accordingly, the light can be generated by the light-emitting tube 11 at the most suitable temperature range.

[Second Embodiment]

Figure 9:
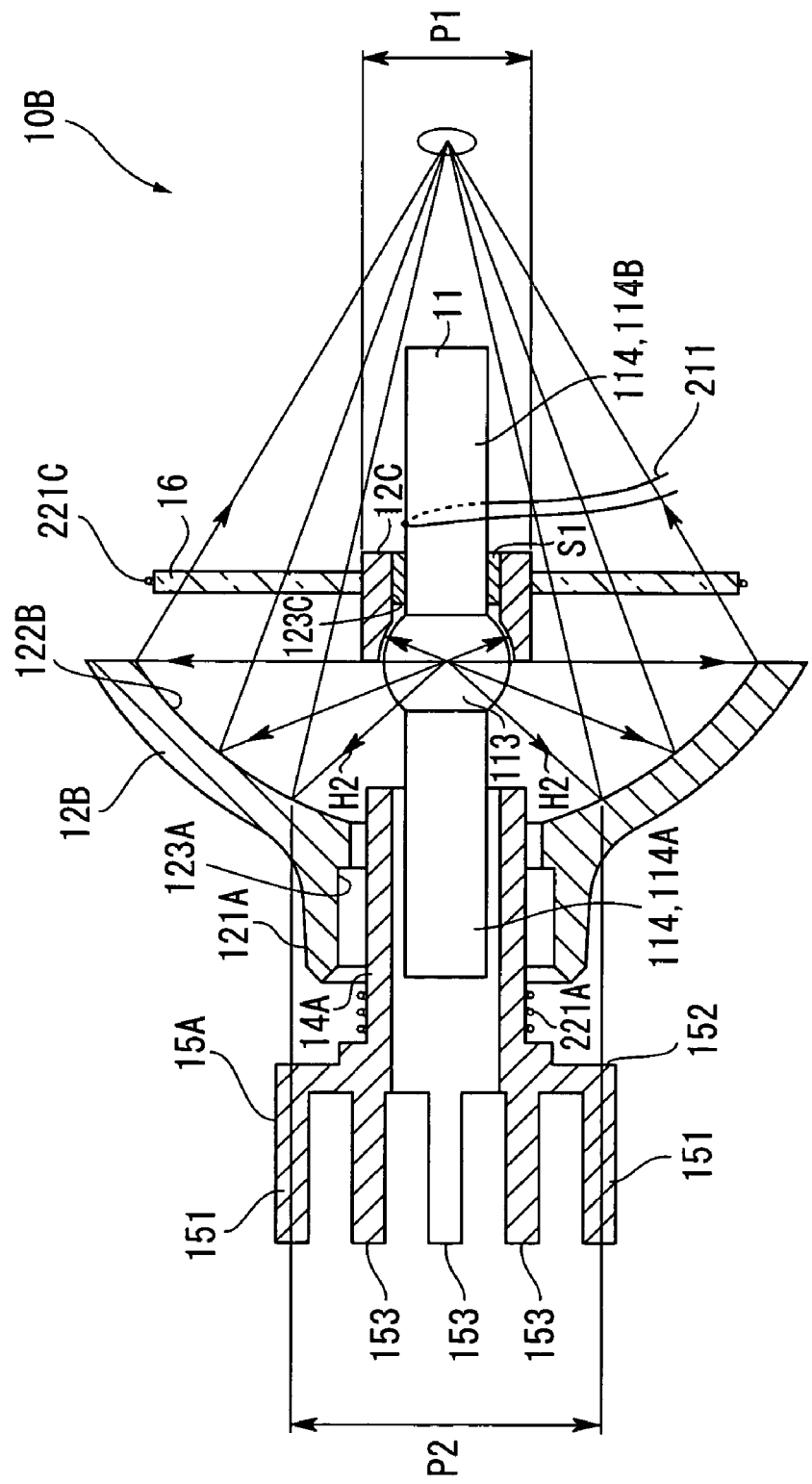
FIG. 9 is a cross section showing a light source device according to a second embodiment of the present invention.

Next, a second embodiment of the present invention will be described below with reference to FIG. 9. Incidentally, in the following description, the same reference numeral will be attached to the same components as the above to omit the description thereof.

A light source device 10B of the present embodiment has a first reflector 12B on which the first sealing portion 114A is fixed, and a sub-reflection mirror 12C fixed to the second sealing portion 114B, the light source device 10B being used for a light source of a projector as in the above first embodiment.

Incidentally, the trigger wire 116 is not attached to the outer surface of the second sealing portion 114B in the present embodiment.

The first reflector 12B has the neck portion 121A and a reflecting portion 122B in the same manner as the reflector 12A of the first embodiment. The reflecting portion 122B has a smaller diameter than the reflecting portion 122A of the reflector 12A.

The sub-reflection mirror 12C is made of a heat-conductive material, which may preferably be sapphire, light-transmissive alumina, quartz crystal, fluorite and YAG (yttrium aluminum garnet).

The sub-reflection mirror 12C is attached to the second sealing portion 114B by inserting the second sealing portion 114B into a hole 123C formed on the bottom side of the sub-reflection mirror 12C. At this time, the hole 123C and the second sealing portion 114B are adhered through a heat-conductive adhesive S1 such as silica-alumina or alumina-nitride adhesive.

The sub-reflection mirror 12C is opposed to the first reflector 12B and is disposed so that the reflection surface thereof surrounds approximately half of the light-emitting portion 113 on the side of the second sealing portion 114B and the light irradiated from the center of the light-emitting portion 113 to be incident on the sub-reflection mirror 12C and the normal line of the sub-reflection mirror 12C are substantially aligned.

By surrounding approximately half of the second sealing portion 114B of the light-emitting portion 113 with the sub-reflection mirror 12C, the reflecting portion 122B of the first reflector 12B can be sized to surround approximately half of the light-emitting portion 113 on the side of the first sealing portion 114A. Accordingly, the diameter of the reflecting portion 122B of the first reflector 12B can be made smaller than the reflector 12A of the aforesaid embodiment.

Further, the outer profile P1 of the sub-reflection mirror 12C may preferably be smaller than a diameter P2 of the reflection surface of the reflecting portion 112B of the first reflector 12B corresponding to a marginal light H2 capable of being utilized by the optical system on the light-irradiation side of the light source device 10B. According to the above arrangement, in the light irradiated by the light-emitting portion 113, the light within the area capable of being utilized by the optical system on the light-irradiation side of the light source device 10B is not blocked by the sub-reflection mirror 12C after being reflected by the first reflector 12B. The marginal light H2 denotes a light bordering the area where the light beam irradiated by the light-emitting portion 113 is naturally blocked by the sealing portion 114A.

A heat-conductive transparent member 16 is attached to the outer surface of the sub-reflection mirror 12C through the above-described heat-conductive adhesive.

The transparent member 16 is a sapphire plate component and is disposed to cover the opening of the reflecting portion 122B of the first reflector 12B.

Further, a heating wire 221C such as nichrome wire of the second heating device (not shown) is wound around the transparent member 16 along the circumference thereof. The second heating device includes the heating wire 221C and a voltage-applying device (not shown) for applying voltage on the heating wire 221C. During the heating process, the heat of the heating wire 221C is transferred from the edge of the transparent member 16 toward the sub-reflection mirror 12C.

In the present embodiment, the cooling device 23, the first heating device 22A and the second heating device are controlled by the drive controller 24 substantially in the same manner as the above first embodiment.

Incidentally, though the transparent member 16 is attached to be in contact with the outer surface of the sub-reflection mirror 12C in the present embodiment, the transparent member 16 may be attached to be in contact with both of the sub-reflection mirror 12C and the second sealing portion 114B. Accordingly, the heat can be directly transferred between the transparent member 16 and the second sealing portion 114B.

According to the second embodiment, following advantages can be obtained as well as the same advantages as (1-1) to (1-6) of the first embodiment.

(2-1) Since the sub-reflection mirror 12C and the transparent member 16 are provided on the second sealing portion 114B in the present embodiment, the heat can be also transferred from the second sealing portion 114B. For instance, in order to cool the light-emitting tube 11, the heat on the second sealing portion 114B can be transferred to the sub-reflection mirror 12C and the transparent member 16 to be radiated. In order to heat the light-emitting tube 11, the heat can be conducted from the peripheral edge of the transparent member 16 to the sub-reflection mirror 12C and to the second sealing portion 114B. Accordingly, the light-emitting tube 11 can be cooled and heated in a more efficient manner as compared to an arrangement where the heat is conducted only from the first sealing portion 114A, so that the temperature of the light-emitting tube 11 can be more accurately controlled.

(2-2) Since the transparent member 16 is a plate-shaped member and has large surface area, the heat can be efficiently radiated during the cooling process and the temperature of the light-emitting tube 11 can be set at a predetermined temperature.

(2-3) Further, since the transparent member 16 is attached to the sub-reflection mirror 12C, the light beam irradiated by the light-emitting portion 113 of the light-emitting tube 11 is not blocked.

(2-4) Since the sub-reflection mirror 12C is attached to the second sealing portion 114B, the light being irradiated by the light-emitting tube 11 to be a stray light can be reflected to the first reflector 12B, thereby improving the light utilization rate.

(2-5) Since the transparent member 16 attached to the sub-reflection mirror 12C is attached to cover the opening of the first reflector 12B, the transparent member 16 can also work as an anti-explosion glass. Though a gap is formed between the opening of the first reflector 12B and the transparent member 16 in FIG. 9, when the gap is eliminated by abutting the components, the broken pieces generated when the light-emitting portion 113 is exploded can be prevented from being dispersed to the outside of the light source device 10B.

(2-6) Since the heat-conductive adhesive is coated between the sub-reflection mirror 12C and the transparent member 16 and the heat-conductive adhesive S1 is coated between the sub-reflection mirror 12C and the second sealing portion 114B, the heat conduction between the second sealing portion 114B and the sub-reflection mirror 12C and between the sub-reflection mirror 12C and the transparent member 16 is not blocked by the adhesive.

Next, a third embodiment of the present invention will be described below with reference to FIG. 10.

Figure 10:
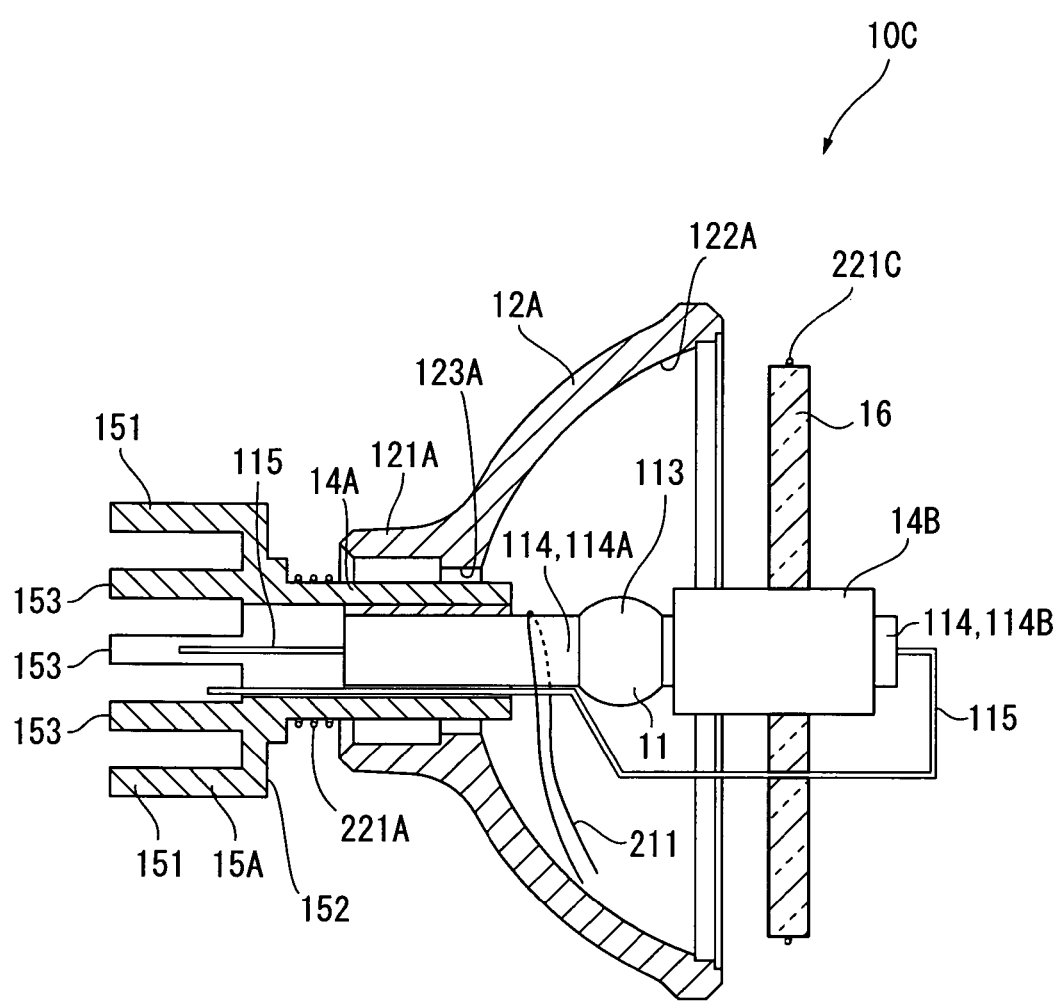
FIG. 10 is a cross section showing a light source device according to a third embodiment of the present invention.

FIG. 10 shows a light source device 10C according to the present embodiment.

Though the heat-conductive member 14A is attached only on the first sealing portion 114A of the light-emitting tube 11 of the light source device 10A in the first and the second embodiments, a heat-conductive member 14B is attached along the outer surface of the second sealing portion 114B of the light-emitting tube 11 in the present embodiment. Incidentally, in the present embodiment, the trigger wire 116 is not attached to the outer surface of the second sealing portion 114B in the same manner as the second embodiment.

The heat-conductive member 14B is formed in a cylindrical shape in the same manner as the heat-conductive member 14A with an end thereof being extended to a section near the light-emitting portion 113. The heat-conductive member 14B may preferably be a material with thermal conductivity of 5 W/(m·K) or higher such as sapphire, quartz crystal, fluorite, alumina and aluminum nitride. In the same manner as the heat-conductive member 14A, a slit is cut along the longitudinal direction of the heat-conductive member 14B, the slit allowing thermal expansion of the second sealing portion 114B.

Figure 11:
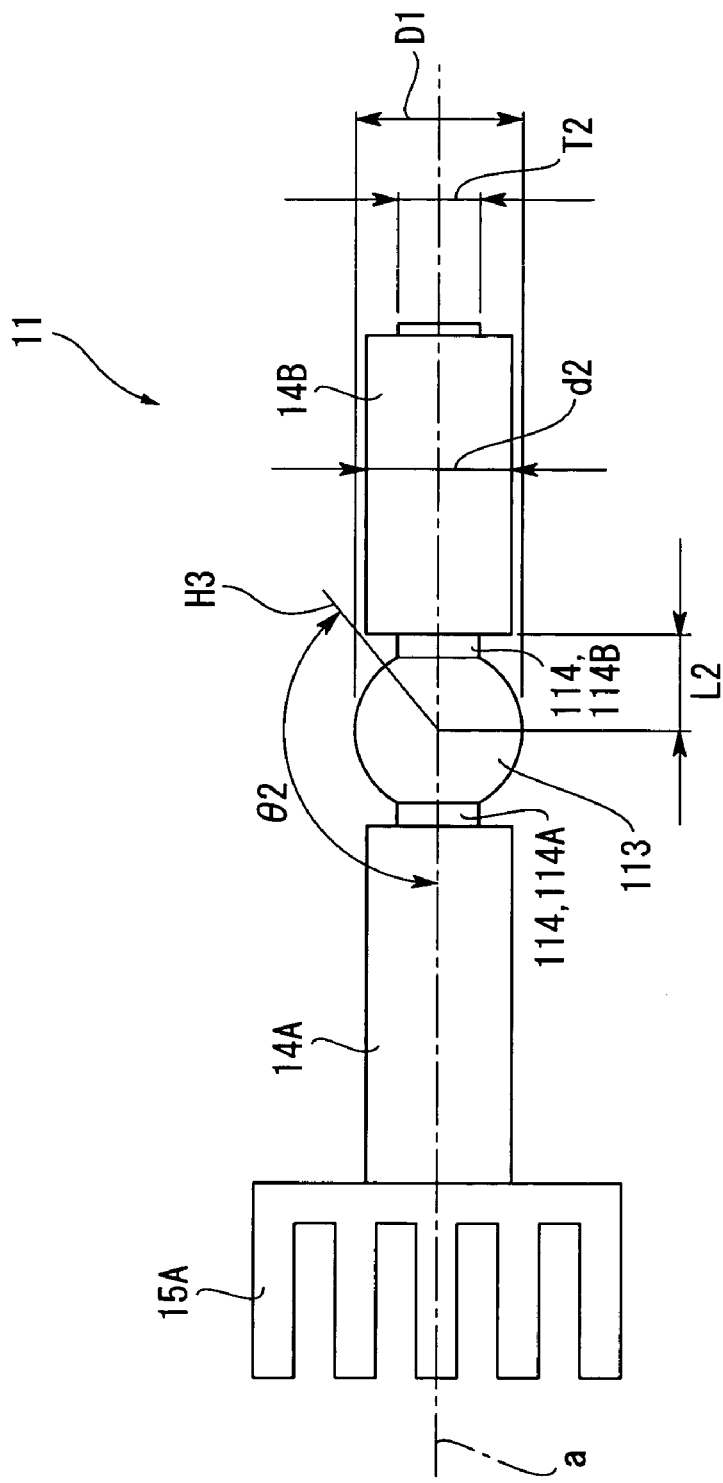
FIG. 11 is a schematic illustration showing a relationship between sizes of a light-emitting tube and a heat-conductive member of the light source device in the third embodiment.

Further, as shown in FIG. 11, when the diameter of the heat-conductive member 14B is d2, the diameter of the light-emitting portion 113 of the light-emitting tube 11 is D1, the diameter of the second sealing portion 114B is T2, the distance from the center of the light-emitting portion 113 to an end of the heat-conductive member 14B near the light-emitting portion 113 is L2, and the maximum angle formed by the light beam irradiated by the light-emitting portion 113 to be used by the optical system disposed on the light-irradiation side of the light source device 10C and an extension line a formed by extending the illumination optical axis of the optical system toward the light-emitting tube 11 is θ2, L2 is represented by the following formula (10) and d2 is represented by the following formula (11).

$$\sqrt{\left[\left(\frac{D1}{2}\right)^2 - \left(\frac{T2}{2}\right)^2\right]} \leq L2 \leq 10 \tag{10}$$

$$d2 = 2 \times L2 \times (-\tan \theta 2) \tag{11}$$

Accordingly, d2 can be represented as formula (12).

$$\sqrt{\left[\left(\frac{D1}{2}\right)^2 - \left(\frac{T2}{2}\right)^2\right]} \times 2 \times (-\tan\theta 2) \leq d2 \leq 10 \times 2 \times (-\tan\theta 2) \tag{12}$$

The maximum angle θ2 formed by the light beam irradiated by the light-emitting portion 113 to be used by the optical system and the extension line a formed by extending the illumination optical axis of the optical system toward the light-emitting tube 11 denotes the angle formed by a border light H3 bordering the area where the light beam irradiated by the light-emitting portion 113 to the second sealing portion 114B is naturally blocked by the second sealing portion 114B and the extension line a of the illumination optical axis.

The above heat-conductive member 14B is adhered through a highly heat-conductive inorganic adhesive such as a silica-alumina or aluminum-nitride adhesive in the same manner as the heat-conductive member 14A.

Further, as shown in FIG. 10, a heat-conductive transparent member 16 is attached on the outer surface of the heat-conductive member 14B through a heat-conductive adhesive as in the second embodiment, and a heating wire 221C such as nichrome wire of the second heating device (not shown) are wound along the periphery of the transparent member 16. In other words, the second heating device of the present embodiment includes the heating wire 221C and a voltage-applying device for applying voltage on the heating wire 221C as in the second embodiment. During the heating process, the heat of the heating wire 221C is transferred from the edge of the transparent member 16 toward the heat-conductive member 14B. In the present embodiment, the cooling device 23, the first heating device 22A and the second heating device are controlled by the drive controller 24 in the same manner as the second embodiment.

According to the third embodiment, following advantages can be obtained as well as the advantages substantially the same as (1-1) to (1-6) in the first embodiment and (2-2), (2-3) and (2-5) in the second embodiment.

(3-1) In the present embodiment, by attaching the heat-conductive members 14A and 14B on both of the sealing portions 114A and 114B of the light-emitting tube 11, the heat can be radiated and applied from the sections near both sides of the light-emitting portion 113. Accordingly, the light-emitting tube 11 can be cooled and heated in a more efficient manner than an arrangement where the heat-conductive member 14A is attached only on the first sealing portion 114A, so that the temperature of the light-emitting tube 11 can be controlled at a predetermined temperature.

In other words, when the light-emitting tube 11 is cooled, the heat can be radiated from the heat-conductive member 14B and the transparent member 16 attached to the heat-conductive member 14B.

Further, when the light-emitting tube 11 is heated, the heat can be transferred from the edge of the transparent member 16 toward the heat-conductive member 14B by the second heating device as in the second embodiment.

(3-2) Since the diameter d2 of the heat-conductive member 14B attached to the second sealing member 114B is set within the range shown in the formula (12), the light beam irradiated by the light-emitting portion 113 is not blocked and the same amount of light as in the arrangement without providing the heat-conductive member 14B can be secured.

(3-3) Since the heat-conductive member 14B is formed in a cylindrical shape, it is only necessary to insert the sealing portion 114B into the heat-conductive member 14B in order to attach the heat-conductive member 14B to the sealing portion 114B of the light-emitting tube 11, so that the heat-conductive member 14B can be easily attached.

(3-4) Since the heat-conductive adhesive is coated between the heat-conductive member 14B and the transparent member 16 and the heat-conductive adhesive is coated between the heat-conductive member 14B and the second sealing portion 114B, the heat conduction between the second sealing portion 114B and the heat-conductive member 14B and between the heat-conductive member 14B and the transparent member 16 is not blocked by the adhesive.

Incidentally, the scope of the present invention is not restricted to the above-described embodiments, but includes modifications and improvements as long as an object of the present invention can be achieved.

For instance, in the above embodiments, though the cooling air introduced into the projector by the cooling fan (cooling device 23) cools the light source devices 10A to 10C after cooling the other optical components, the light source devices 10A to 10C may be directly cooled by the cooling air introduced by the cooling fan.

In the above arrangement, the cooling fan may be controlled so that the cooling fan is rotated when the temperature of the light-emitting tube 11 exceeds a predetermined temperature (temperature t3 or higher).

Though the cooling fan is used as the cooling device 23 in the above embodiments, a cooling device having a thermoelectric conversion element using the Peltier effect may alternatively used.

Though the heat transferred to the heat-conductive member 14A is radiated by the heat-radiation fin 15A and the heat-conductive member 14A is forcibly cooled by the cooling fan (cooling device 23) in the above embodiments, the heat transferred to the heat-conductive member 14A may be radiated by only one of the heat-radiation fin 15A and the cooling fan.

Though the projector 1 has both of the heating device and the cooling device in the above embodiments, only one of the heating device and the cooling device may be provided or both of the devices may be omitted. Accordingly, the arrangement of the projector 1 can be simplified.

Though the heat-conductive members 14A and 14B have cylindrical shape, any arrangement is possible as long as the heat-conductive member extends along the first sealing portion 114A or the second sealing portion 114B with an end thereof extending near the light-emitting portion 113. For instance, the heat-conductive member may be formed as a plate-shaped component. However, the sealing portions 114A and 114B can be integrally covered by the cylindrical heat-conductive members 14A and 14B, so that the heat-conduction efficiency can be improved.

Further, though the diameter d1 of the heat-conductive member 14A attached to the first sealing portion 114A is defined within a range shown in the formula (9), the diameter may be set outside the range. Similarly, the diameter d2 of the heat-conductive member 14B attached to the second sealing portion 114B of the third embodiment may be set outside the range shown in the formula (12).

Though the heat-conductive member 14A is attached on the first sealing portion 114A in the second and the third embodiments, the heat-conductive member 14A may not be attached. When the sub-reflection mirror 12C, the transparent member 16 and the heat-conductive member 14B are attached only on the second sealing portion 114B and the heat is radiated and applied only from the side of the second sealing portion 114B, the light-emitting tube 11 can be controlled at a predetermined temperature. The number of the components can be reduced without attaching the heat-conductive member 14A on the first sealing portion 114A.

Though the transparent member 16 is attached on the outer surface of the heat-conductive member 14B in the second and the third embodiments, the transparent member 16 may not be provided. Accordingly, the number of the components can be reduced.

Though the first reflector 12B having the reflecting portion 122B with smaller diameter than the diameter of the reflecting portion 122A of the reflector 12A of the first embodiment is used in the second embodiment, the reflector 12A having the reflecting portion 122A with greater diameter may be used as in the first embodiment. In the above arrangement, since the diameter of the reflecting portion 122A of the reflector 12A is great, the position of the light-emitting portion 113 of the light-emitting tube 11 can be moved toward the opening of the reflector 12A. By locating the light-emitting tube 11 on the side of the opening of the reflector 12A, the light-condensing spot by the reflection of the reflector 12A can be narrowed.

Though the light source devices 10A to 10C of the present invention are applied in a projector having the liquid crystal panels 441 as optical modulators in the above embodiments, the light source devices 10A to 10C may be used in a projector provided with an optical modulator using a micromirror.

Though the light source devices 10A to 10C are installed in the projector 1 in the above embodiments, the light source devices may be installed in the other optical equipments.

What is claimed is:

1. A projector, comprising:
   a light source device having a light-emitting tube that includes a light-emitting portion that generates a light beam by an electric discharge between electrodes and sealing portions provided on both sides of the light-emitting portion and a heat-conductive member attached along the outer surface of at least one of the sealing portions, an end of the heat-conductive member being extended to a section near the light-emitting portion; and
   an optical system disposed on a light-irradiation side of the light source device, the optical system including an optical modulator that modulates a light beam irradiated by the light source in accordance with an input image information to form an optical image, and a color-combining optical device that combines each color light from the optical modulator,
   the heat-conductive member being a cylindrical component,
   the light source device including a reflector that reflects a light beam irradiated by the light-emitting portion of the light-emitting tube,
   the first sealing portion of the light-emitting tube being disposed on the side of the reflector and being fixed to the reflector through the cylindrical heat-conductive member attached to the first sealing portion,
   the first end of the heat-conductive member extending to the section near the light-emitting portion and a second end of the heat-conductive member opposite to the first end extending to the outside of the reflector with a heat-radiation fin being attached to the second end,
   a heat-conductive sub-reflection mirror opposing to the reflector being attached to the second sealing portion of the light-emitting tube, and
   a heat-conductive transparent member being attached to the outer surface of the sub-reflection mirror.

2. The projector according to claim 1,
   the light source device including a reflector that reflects a light beam irradiated by the light-emitting portion of the light-emitting tube, and
   the first sealing portion of the light-emitting tube being disposed on the side of the reflector and being fixed to the reflector through the cylindrical heat-conductive member attached to the first sealing portion.

3. The projector according to claim 1,
   the light source device being a reflector that reflects a light beam irradiated by the light-emitting portion of the light-emitting tube, and
   the first sealing portion of the light-emitting tube being fixed to the reflector and the cylindrical heat-conductive member being attached to the second sealing portion.

4. The projector according to claim 1, further comprising:
   a cooling device that cools the heat-conductive member;
   a heating device that heats the heat-conductive member;
   a temperature detector that detects the temperature of the light-emitting tube of the light source device; and
   a drive controller that drives the heating device when the temperature detected by the temperature detector is a first predetermined temperature or lower and drives the cooling device when the temperature detected by the temperature detector is a second predetermined temperature or higher.

5. A projector, comprising:
   a light source device having a light-emitting tube including a light-emitting portion that generates a light beam by an electric discharge between electrodes and a first and a second sealing portions provided on both sides of the light-emitting portion and a first reflector that reflects the light beam irradiated by the light-emitting tube;
   an optical system disposed on a light-irradiation side of the light source device,
   the first sealing portion of the light-emitting tube being fixed to the first reflector and a heat-conductive sub-reflection mirror opposing to the first reflector being attached to the second sealing portion;
   a heat-conductive transparent member attached to an outer surface of the sub-reflection mirror;
   a cooling device that cools the transparent member;
   a heating device that heats the transparent member;
   a temperature detector that detects the temperature of the light-emitting tube of the light source device; and
   a drive controller that drives the heating device when the temperature detected by the temperature detector is a first predetermined temperature or lower and drives the cooling device when the temperature detected by the temperature detector is a second predetermined temperature or higher.

* * * * *